(12) United States Patent
Wartnick et al.

(10) Patent No.: US 8,521,883 B1
(45) Date of Patent: Aug. 27, 2013

(54) TECHNIQUES FOR NETWORK BANDWIDTH MANAGEMENT

(75) Inventors: Jeremy Howard Wartnick, Minnetonka, MN (US); Jeremy Dean Swift, Plymouth, MN (US)

(73) Assignee: Symantec Corporation, Mountain View, CA (US)

( * ) Notice: Subject to any disclaimer, the term of this patent is extended or adjusted under 35 U.S.C. 154(b) by 236 days.

(21) Appl. No.: 12/958,970

(22) Filed: Dec. 2, 2010

(51) Int. Cl.
*G06F 15/173* (2006.01)

(52) U.S. Cl.
USPC .......................................... 709/226

(58) Field of Classification Search
USPC ................ 370/329, 230, 486, 235; 709/235, 709/227, 226
See application file for complete search history.

(56) References Cited

U.S. PATENT DOCUMENTS

| | | | |
|---|---|---|---|
| 7,065,048 B1* | 6/2006 | Levy et al. | 370/230.1 |
| 2004/0165528 A1* | 8/2004 | Li et al. | 370/230 |
| 2009/0144425 A1* | 6/2009 | Marr et al. | 709/226 |
| 2010/0095021 A1* | 4/2010 | Samuels et al. | 709/235 |
| 2010/0195611 A1* | 8/2010 | Allen et al. | 370/329 |

OTHER PUBLICATIONS

"A CommVault White Paper: CommVault® Galaxy™ Backup & Recovery," CommVault Systems, Inc.; 2008; 42 pages.
CommVault Data Sheet; "CommNet Service Manager 7.0," found at: http://www.commvault.com/pdf/DS_CNSM_Overview.pdf; 2007; 5 pages.

\* cited by examiner

*Primary Examiner* — Chi Pham
*Assistant Examiner* — Fahmida Chowdhury
(74) *Attorney, Agent, or Firm* — Wilmer Cutler Pickering Hale and Dorr LLP

(57) ABSTRACT

Techniques for network bandwidth management are disclosed. In one particular exemplary embodiment, the techniques may be realized as a method for network bandwidth management comprising determining, using at least one computer processor, a throughput measurement for a first network client of a plurality of network clients, determining if throughput for the first network client is adequate for a first task based at least on the throughput measurement, in the event throughput is not adequate, negotiating for a different amount of network bandwidth, wherein the negotiation comprises sending a first task priority for the first network client and the throughput measurement to at least one second network client of the plurality of network clients, and receiving an allocation of network bandwidth based on a comparison of the first task priority with at least one second task priority for the at least one second network client.

20 Claims, 5 Drawing Sheets

TECHNIQUES FOR NETWORK BANDWIDTH MANAGEMENT

FIELD OF THE DISCLOSURE

The present disclosure relates generally to allocating network bandwidth and, more particularly, to techniques for network bandwidth management.

BACKGROUND OF THE DISCLOSURE

Network clients, such as, for example, network clients transferring data for backup or archival or other tasks, may require large amounts of network bandwidth. Although allocation of network bandwidth (e.g., bandwidth throttling) may be performed at a protocol level or at an individual client level, such allocation may be made with no insight into the priority of a task. Throttling bandwidth at a protocol or individual client level may result in allocation of bandwidth to lower priority tasks over higher priority tasks, or even allocation of network resources regardless of task priority.

In view of the foregoing, it may be understood that there may be significant problems and shortcomings associated with current network bandwidth management technologies.

SUMMARY OF THE DISCLOSURE

Techniques for network bandwidth management are disclosed. In one particular exemplary embodiment, the techniques may be realized as a method for network bandwidth management comprising determining, using at least one computer processor, a throughput measurement for a first network client of a plurality of network clients, determining if throughput for the first network client is adequate for a first task based at least on the throughput measurement, in the event throughput is not adequate, negotiating for a different amount of network bandwidth, wherein the negotiation comprises sending a first task priority for the first network client and the throughput measurement to at least one second network client of the plurality of network clients, and receiving an allocation of network bandwidth based on a comparison of the first task priority with at least one second task priority for the at least one second network client.

In accordance with other aspects of this particular exemplary embodiment, the second network client may be configured to perform network allocation request arbitration.

In accordance with further aspects of this particular exemplary embodiment, receiving the different amount of network bandwidth may comprise receiving the allocation from the second network client.

In accordance with additional aspects of this particular exemplary embodiment, the first task priority and throughput measurement may be sent to the plurality of network clients.

In accordance with additional aspects of this particular exemplary embodiment, the negotiation may comprise a peer to peer negotiation among the plurality of network clients based at least in part on task priority.

In accordance with additional aspects of this particular exemplary embodiment, the peer to peer negotiation may further comprise a token passing protocol configured to build a data structure of task priorities, and wherein each network client of the plurality of network clients allocates its own bandwidth according to the data structure of task priorities.

In accordance with additional aspects of this particular exemplary embodiment, network bandwidth available for allocation may comprise at least one of: total available network bandwidth and a specified network bandwidth.

In accordance with additional aspects of this particular exemplary embodiment, the specified network bandwidth may comprise a subset of total available network bandwidth.

In accordance with additional aspects of this particular exemplary embodiment, the techniques may further comprise identifying total available network bandwidth.

In accordance with additional aspects of this particular exemplary embodiment, the techniques may further comprising determining, in the event the throughput is adequate, if the throughput is within a specified network bandwidth, in the event the throughput is not within the specified network bandwidth, performing the negotiation for additional network bandwidth allocation.

In accordance with additional aspects of this particular exemplary embodiment, the techniques may further comprise determining whether the allocation of network bandwidth is adequate for the first task, and in the event the allocation of network bandwidth is not adequate for the first task, repeating the negotiation for a different amount of network bandwidth.

In accordance with additional aspects of this particular exemplary embodiment, the techniques may further comprise determining that a repeated negotiation for a different amount of network bandwidth resulted in an inadequate allocation of network bandwidth, and reverting to a prior allocation of network bandwidth.

In accordance with additional aspects of this particular exemplary embodiment, the techniques may further comprise receiving an indication that at least one of: a network condition has changed and the first task priority has changed, and repeating the negotiation for a different amount of network bandwidth based on the received indication.

In accordance with additional aspects of this particular exemplary embodiment, the techniques may further comprise periodically transmitting at least one of a current task priority and a current throughput measurement from the first network client, and determining whether at least one of the current task priority and the current throughput measurement is different from with previously sent first task priority and the throughput measurement for the first network client.

In accordance with additional aspects of this particular exemplary embodiment, the first network client may perform multiple tasks requiring network bandwidth, and wherein bandwidth may be negotiated for each of the multiple tasks separately.

In accordance with additional aspects of this particular exemplary embodiment, the first network client may perform multiple tasks requiring network bandwidth, and wherein bandwidth may be negotiated for using a highest priority of the multiple tasks.

In accordance with additional aspects of this particular exemplary embodiment, the plurality of network clients may comprise network clients running different installations of a same application, and wherein task priority may be coordinated across the same application.

In accordance with additional aspects of this particular exemplary embodiment, the techniques may be realized as at least one non-transitory processor readable storage medium for storing a computer program of instructions configured to be readable by at least one processor for instructing the at least one processor to execute a computer process for performing the method.

In another particular exemplary embodiment, the techniques may be realized as an article of manufacture for network bandwidth management, the article of manufacture comprising at least one non-transitory processor readable medium, and instructions stored on the at least one medium. The instructions may be configured to be readable from the at least one medium by at least one processor and thereby cause the at least one processor to operate so as to determine a throughput measurement for a first network client of a plurality of network clients, determine if throughput for the first network client is adequate for a first task based at least on the throughput measurement, in the event throughput is not adequate, negotiate for a different amount of network bandwidth. The negotiation may comprise sending a first task priority for the first network client and the throughput measurement to at least one second network client of the plurality of network clients, and receiving an allocation of network bandwidth based on a comparison of the first task priority with at least one second task priority for the at least one second network client.

In yet another particular exemplary embodiment, the techniques may be realized as a system for network bandwidth management comprising one or more processors communicatively coupled to a network, wherein the one or more processors are configured to determine a throughput measurement for a first network client of a plurality of network clients, determine if throughput for the first network client is adequate for a first task based at least on the throughput measurement, in the event throughput is not adequate, negotiate for a different amount of network bandwidth. The negotiation may comprise sending a first task priority for the first network client and the throughput measurement to at least one second network client of the plurality of network clients, and receiving an allocation of network bandwidth based on a comparison of the first task priority with at least one second task priority for the at least one second network client.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DETAILED DESCRIPTION OF EXEMPLARY EMBODIMENTS

Figure 1:
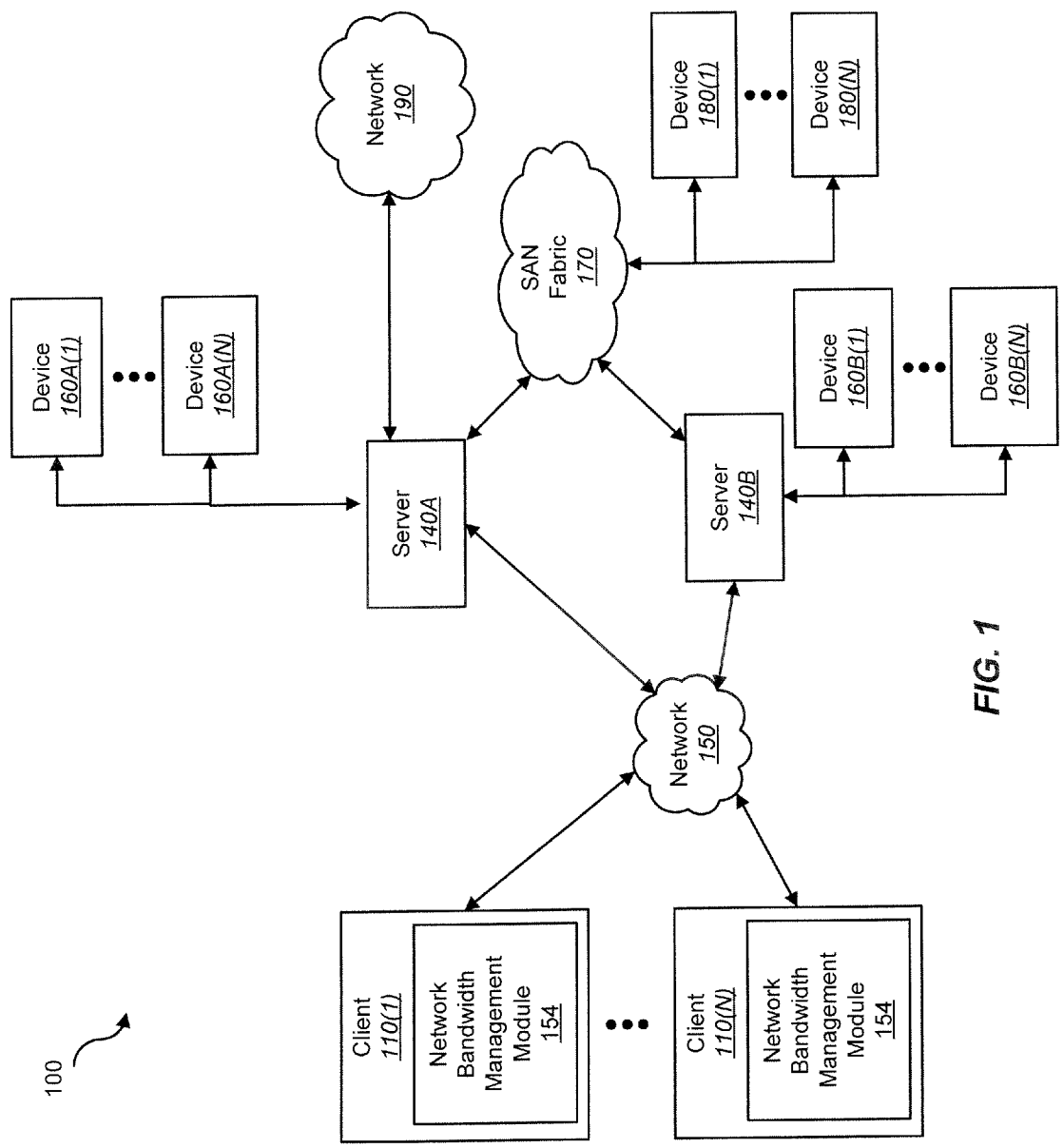
FIG. 1 shows a block diagram depicting a network architecture containing a platform for network bandwidth management in accordance with an embodiment of the present disclosure.

FIG. 1 shows a block diagram depicting a network architecture 100 for network bandwidth management in accordance with an embodiment of the present disclosure. FIG. 1 is a simplified view of network architecture 100, which may include additional elements that are not depicted. Network architecture 100 may contain client systems 110(1)-110(N) as well as servers 140A and 140B (one or more of which may be implemented using computer system 200 shown in FIG. 2). Client systems 110(1)-110(N) may be communicatively coupled to a network 150. Server 140A may be communicatively coupled to storage devices 160A(1)-(N), and server 140B may be communicatively coupled to storage devices 160B(1)-(N). Servers 140A and 140B may be communicatively coupled to a SAN (Storage Area Network) fabric 170. SAN fabric 170 may support access to storage devices 180(1)-(N) by servers 140A and 140B, and by client systems 110(1)-110(N) via network 150. Server 140A may be communicatively coupled to network 190.

The description below describes network elements, computers, and/or components of a system and method for network bandwidth management that may include one or more modules. As used herein, the term "module" may be understood to refer to computing software, firmware, hardware, and/or various combinations thereof. Modules, however, are not to be interpreted as software which is not implemented on hardware, firmware, or recorded on a processor readable recordable storage medium (i.e., modules are not software per se). It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

Figure 2:
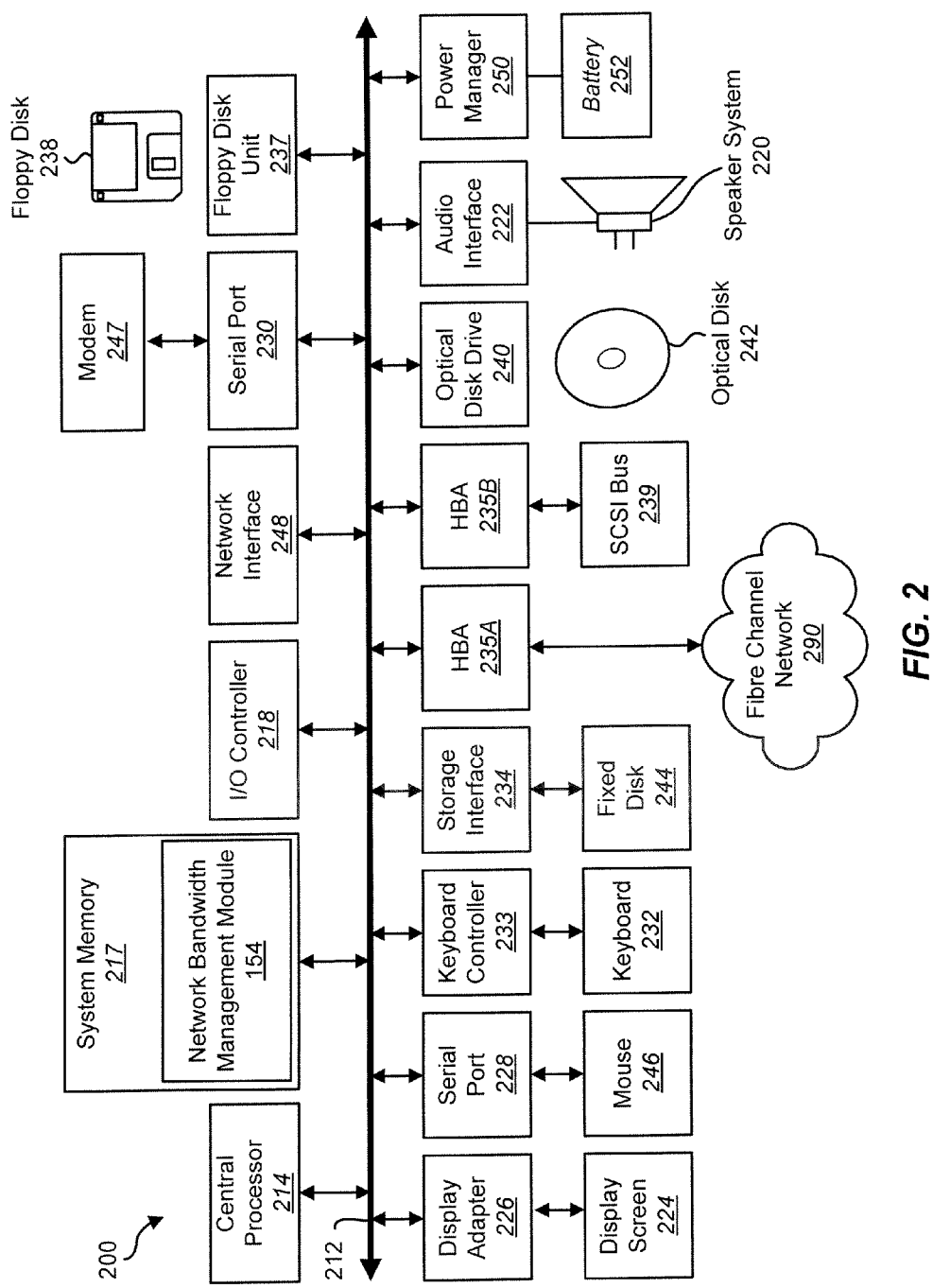
FIG. 2 depicts a block diagram of a computer system in accordance with an embodiment of the present disclosure.

With reference to computer system 200 of FIG. 2, network interface 248 or some other method may be used to provide connectivity from one or more of client systems 110(1)-110(N) to network 150. Client systems 110(1)-110(N) may be able to access information on server 140A or 140B using, for example, a web browser or other client software. Such a client may allow client systems 110(1)-110(N) to access data hosted by server 140A or 140B or one of storage devices 160A(1)-(N), 160B(1)-(N), and/or 180(1)-(N).

Networks 150 and 190 may be local area networks (LANs), wide area networks (WANs), the Internet, cellular networks, satellite networks, or other networks that permit communication between client systems 110(1)-110(N), servers 140, and other devices communicatively coupled to networks 150 and 190. Networks 150 and 190 may further include one, or any number, of the exemplary types of networks mentioned above operating as a stand-alone network or in cooperation with each other. Networks 150 and 190 may utilize one or more protocols of one or more clients or servers to which they are communicatively coupled. Networks 150 and 190 may translate to or from other protocols to one or more protocols of network devices. Although networks 150 and 190 are each depicted as one network, it should be appreciated that according to one or more embodiments, networks 150 and 190 may each comprise a plurality of interconnected networks.

Storage devices 160A(1)-(N), 160B(1)-(N), and/or 180(1)-(N) may be network accessible storage and may be local, remote, or a combination thereof to server 140A or 140B. Storage devices 160A(1)-(N), 160B(1)-(N), and/or 180(1)-(N) may utilize a redundant array of inexpensive disks ("RAID"), magnetic tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), optical based storage, or other computer accessible storage. Storage devices 160A(1)-(N), 160B(1)-(N), and/or 180(1)-(N) may be used for backup or archival purposes.

According to some embodiments, client systems 110(1)-110(N) may be a smartphone, PDA, desktop computer, a laptop computer, a server, another computer, or another device coupled via a wireless or wired connection to network 150. Client systems 110(1)-110(N) may receive data from user input, a database, a file, a web service, and/or an application programming interface.

Servers 140A and 140B may be application servers, archival platforms, backup servers, network storage devices, media servers, email servers, document management platforms, enterprise search servers, or other devices communicatively coupled to network 150. Servers 140A and 140B may utilize one of storage devices 160A(1)-(N), 160B(1)-(N), and/or 180(1)-(N) for the storage of application data, backup data, or other data. Servers 140A and 140B may be hosts, such as an application server, which may process data traveling between client systems 110(1)-110(N) and a backup platform, a backup process, and/or storage. According to some embodiments, servers 140A and 140B may be platforms used for backing up and/or archiving data. According to some embodiments, servers 140A and 140B may be media servers containing network bandwidth management module 154. Servers 140A and 140B may use using network bandwidth management modules 154 to negotiate bandwidth allocations for bandwidth intensive applications such as, for example, backup applications.

According to some embodiments, client systems 110(1)-110(N) may contain network bandwidth management module 154. Network bandwidth management module 154 may provide network bandwidth management services for a plurality of network clients such as client systems 110(1)-110(N). According to some embodiments, a protocol for negotiating network bandwidth allocation among a plurality of network clients may be implemented by network bandwidth management module 154. Client systems 110(1)-110(N) may be clients for which an agreed protocol for determining task or job priority has been established and network bandwidth management module 154 may implement that protocol. For example, client systems 110(1)-110(N) may be network clients containing a same application (e.g., a data management application providing backup, recovery, archival, duplication, and other services) which may perform tasks demanding large amounts of network bandwidth. A protocol may be implemented to determine a priority of such tasks which may be used to determine network bandwidth allocation. For example, a user may be provided with a central console to prioritize jobs or tasks across one or more network clients or default priorities may be assigned based on one or more specified criteria (e.g., a backup task may be assigned a higher priority than an archive task, a restore task may be assigned a higher priority than a duplication task, tasks may be prioritized based on a type of data, a full backup versus an incremental backup, a date since a last backup, etc.).

According to some embodiments, a protocol may be implemented to prioritize tasks based upon a user or a group associated with a task (e.g., a task initiated by a management group may be provided with a higher priority than a task initiated by manufacturing). According to some embodiments, priority may also be determined based on criteria determined by an application. For example, an application may provide indicators of priority of data which may be used to allocate bandwidth among multiple clients using a same application. According to some embodiments, different applications may implement a protocol to provide indicators of data priority independent of the application (e.g., a third party protocol provided a data backup and recovery software). Such a protocol may allow different applications on the same or different network clients to negotiate network bandwidth allocation.

Network bandwidth management module 154 may implement one or more network bandwidth management protocols on client systems 110(1)-110(N). Network bandwidth management module 154 may calculate available network bandwidth or may access a specified network bandwidth parameter.

According to some embodiments, available network bandwidth may be a specified parameter in a policy associated with an application. The specified available network bandwidth may be an allocated subset of total available network bandwidth for the network. This may reserve network bandwidth for network clients and/or applications not implementing a network bandwidth management protocol. For example, two or more of client systems 110(1)-110(N) may be servers providing backup, recovery, archival, and other services and these two client systems 110 may implement one or more network bandwidth management protocols. Other network clients may not implement network bandwidth management protocols and the reserved network bandwidth may be an estimate or calculation of bandwidth used by these clients.

Network bandwidth management module 154 may measure throughput of one or more network clients. Network bandwidth management module 154 may determine the amount of time a transfer takes to complete for a known amount of data to identify a throughput for a network client. If the throughput of a client is adequate for a task of a client (e.g., a backup job) according to some embodiments no further action may be taken by network bandwidth management module 154. If the throughput of a client is not adequate for a task of a client, network bandwidth management module 154 may initiate negotiation of network bandwidth allocation.

According to embodiments, in which a policy, a cap, a maximum bandwidth, and/or a specified available network bandwidth is provided, network bandwidth management module 154 may determine if the policy, cap, maximum bandwidth and/or specified available bandwidth is exceeded. For example, network bandwidth management module 154 may track allocation of a specified bandwidth cap among client systems 110(1)-110(N) (e.g., a bandwidth cap may be 50% of total network bandwidth). If an individual client has throughput indicating sufficient bandwidth to complete a task, but an allocation of such bandwidth would exceed a bandwidth cap, network bandwidth management module 154 may initiate negotiation of network bandwidth allocation.

According to some embodiments, negotiation of network bandwidth allocation may be initiated by a network bandwidth management module 154 sending a priority associated with a current task and a negotiation request. According to some embodiments, one of client systems 110(1)-110(N) may be specified as an arbiter to receive negotiation requests. The negotiation request may be transmitted to other client systems 110(1)-110(N) containing a network bandwidth management module 154 and/or participating in a network bandwidth management protocol. Client systems 110 may transmit task priorities and throughput measurements to the arbiter. The arbiter may determine bandwidth allocations for the client systems 110 based on task priorities of the client systems 110 and/or other factors (e.g., available network bandwidth as indicated by one or more throughput measurements, a network bandwidth allocation policy, and/or a network bandwidth cap). The arbiter may communicate bandwidth allocations to the client systems 110.

An arbiter may be specified or may be selected according to one or more algorithms. For example, an arbiter may be a client system 110 with a highest priority task. The arbiter may allocate adequate bandwidth for its task and may then allocate remaining bandwidth among the other client systems 110 in order of descending task priorities. In another embodiment, an arbiter may be specified or configurable (e.g., an administrator may use an user interface to specify a network client). An arbiter may be a network client with a lowest CPU utilization or the most available resources according to some embodiments.

According to some embodiments, an arbiter may not be used and network bandwidth negotiation may be performed as a peer to peer process. For example, a network bandwidth management module 154 initiate a network bandwidth negotiation by transmitting, to other network bandwidth management modules 154, a negotiation request and a priority associated with a task. Other network bandwidth management modules 154 may transmit a current throughput and a priority associated with a task. The task priorities may be used to determine bandwidth allocation with bandwidth being allocated first to network bandwidth management modules 154 associated with highest priority tasks.

According to some embodiments, a token passing protocol may be used to build a data structure of task priorities associated with network bandwidth management modules 154. Each of the network bandwidth management modules 154 may allocate bandwidth based upon a comparison of its task priority with other task priorities of other network bandwidth management modules 154. According to some embodiments, allocation may proceed in order of a highest priority to a lowest priority using a token passing protocol. For example, a first round of token passing may allow network clients to determine one or more task priorities associated with each client. A second round of token passing may proceed from network clients associated with highest priority tasks to lowest priority tasks and may allow network clients to allocate bandwidth for their respective tasks in order of task priority.

According to some embodiments, one or more of clients 110 may have multiple tasks requiring network bandwidth. According to some embodiments, bandwidth may be allocated on a per task basis and multiple requests for bandwidth or a request containing multiple task priorities may be used. According to some embodiments, bandwidth may be allocated for multiple tasks using a highest priority of the tasks for that network client.

After allocation information is communicated to a network bandwidth management module 154, the network bandwidth management module 154 may determine if the allocated bandwidth is adequate for the task (e.g., a task may have a specified time window to complete such as, for example, a backup time window, or a task may guarantee a minimum rate such as for example a QoS value). If the allocated bandwidth is not adequate for the task, the network bandwidth management module 154 may renegotiate (i.e., initiate a second round of network bandwidth negotiation). If a received network bandwidth allocation is still inadequate, the network bandwidth management module 154 may revert to a prior level.

Network conditions and available bandwidth may be continually changing due to one or more factors. Network bandwidth management protocols as described above may not be implemented on all clients. For example, network bandwidth management module 154 may be implemented as part of an application for backup and recovery and thus backup and recovery clients may participate in network bandwidth management protocols. However, other network clients may use network bandwidth and the availability of network bandwidth to allocate among network bandwidth managed clients may vary. Additional factors may affect network conditions and available bandwidth. For example, tasks may complete or be halted or cancelled, new tasks may be initiated (e.g., new backup jobs), priorities of tasks may be changed, and bandwidth may be added to or subtracted from a network. According to some embodiments, network bandwidth management modules 154 may report, to other network bandwidth management modules 154 and/or to an arbiter, one or more network bandwidth factors including, but not limited to, changes in throughput, addition of a new task, a change in priority of a task, a completion of a task, and other factors. Network bandwidth factors may be reported upon detection or periodically. Reporting of a network bandwidth factor may depend on the network bandwidth factor change detected. For example, a change in priority of a task may trigger a reporting immediately, but a change in network throughput may only be reported periodically. Reporting of a network bandwidth factor may initiate a network bandwidth negotiation and/or a network bandwidth factor may be reported as part of a network bandwidth negotiation.

FIG. 2 depicts a block diagram of a computer system 200 in accordance with an embodiment of the present disclosure. Computer system 200 is suitable for implementing techniques in accordance with the present disclosure. Computer system 200 may include a bus 212 which may interconnect major subsystems of computer system 210, such as a central processor 214, a system memory 217 (e.g. RAM (Random Access Memory), ROM (Read Only Memory), flash RAM, or the like), an Input/Output (I/O) controller 218, an external audio device, such as a speaker system 220 via an audio output interface 222, an external device, such as a display screen 224 via display adapter 226, serial ports 228 and 230, a keyboard 232 (interfaced via a keyboard controller 233), a storage interface 234, a floppy disk drive 237 operative to receive a floppy disk 238, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included may be a mouse 246 (or other point-and-click device, coupled to bus 212 via serial port 228), a modem 247 (coupled to bus 212 via serial port 230), network interface 248 (coupled directly to bus 212), power manager 250, and battery 252.

Bus 212 allows data communication between central processor 214 and system memory 217, which may include read-only memory (ROM) or flash memory (neither shown), and random access memory (RAM) (not shown), as previously noted. The RAM may be the main memory into which the operating system and application programs may be loaded. The ROM or flash memory can contain, among other code, the Basic Input-Output system (BIOS) which controls basic hardware operation such as the interaction with peripheral components. Applications resident with computer system 210 may be stored on and accessed via a computer readable medium, such as a hard disk drive (e.g., fixed disk 244), an optical drive (e.g., optical drive 240), a floppy disk unit 237, or other storage medium. For example, network bandwidth management 154 may be resident in system memory 217.

Storage interface 234, as with the other storage interfaces of computer system 210, can connect to a standard computer readable medium for storage and/or retrieval of information, such as a fixed disk drive 244. Fixed disk drive 244 may be a part of computer system 210 or may be separate and accessed through other interface systems. Modem 247 may provide a direct connection to a remote server via a telephone link or to the Internet via an internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. Code to implement the present disclosure may be stored in computer-readable storage media such as one or more of system memory 217, fixed disk 244, optical disk 242, or floppy disk 238. Code to implement the present disclosure may also be received via one or more interfaces and stored in memory. The operating system provided on computer system 210 may be MS-DOS®, MS-WINDOWS®, OS/2®, OS X®, UNIX®, Linux®, or another known operating system.

Power manager 250 may monitor a power level of battery 252. Power manager 250 may provide one or more APIs (Application Programming Interfaces) to allow determination of a power level, of a time window remaining prior to shutdown of computer system 200, a power consumption rate, an indicator of whether computer system is on mains (e.g., AC Power) or battery power, and other power related information. According to some embodiments, APIs of power manager 250 may be accessible remotely (e.g., accessible to a remote backup management module via a network connection). According to some embodiments, battery 252 may be an Uninterruptable Power Supply (UPS) located either local to or remote from computer system 200. In such embodiments, power manager 250 may provide information about a power level of an UPS.

Figure 3:
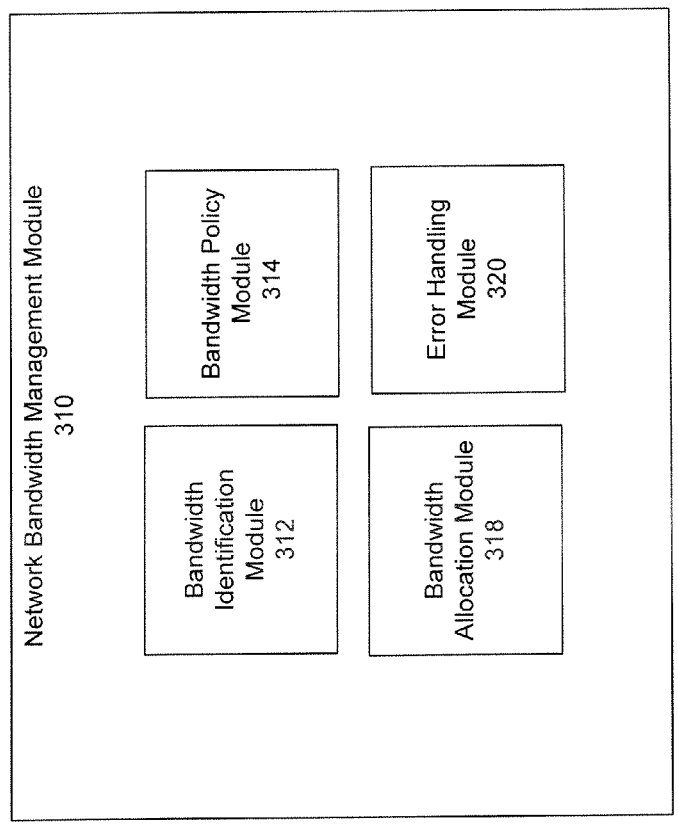
FIG. 3 shows a module for network bandwidth management in accordance with an embodiment of the present disclosure.

Referring to FIG. 3, there is shown a network bandwidth management 310 in accordance with an embodiment of the present disclosure. As illustrated, the network bandwidth management 310 may contain one or more components including bandwidth identification module 312, bandwidth policy module 314, bandwidth allocation module 318, and bandwidth error handling module 320.

Bandwidth identification module 312 may measure throughput of one or more network clients (e.g., clients 110 and/or servers 140). Bandwidth identification module 312 may determine the amount of time a transfer takes to complete for a known amount of data to identify a throughput for a network client. If the throughput of a client is adequate for a task of a client (e.g., a backup job) according to some embodiments no further action may be taken. If the throughput of a client is not adequate for a task of a client, bandwidth allocation module 318 may initiate negotiation of network bandwidth allocation.

Bandwidth policy module 314 may determine if a policy, cap, maximum bandwidth and/or specified available bandwidth is exceeded by a network bandwidth allocation matching a throughput on a client. For example, Bandwidth policy module 314 may track allocation of a specified bandwidth cap among client systems 110(1)-110(N) or servers 140 of FIG. 1 (e.g., a bandwidth cap may be 50% of total network bandwidth). If an individual client has throughput indicating sufficient bandwidth to complete a task, but an allocation of such bandwidth would exceed a bandwidth cap, bandwidth allocation module 318 may initiate negotiation of network bandwidth allocation.

Bandwidth allocation module 318 may initiate negotiation of network bandwidth allocation by sending a priority associated with a current task and a negotiation request. According to some embodiments, a bandwidth allocation module 318 of one of client systems 110(1)-110(N) or servers 140 of FIG. 1 may be specified as an arbiter to receive negotiation requests. The negotiation request may be transmitted to other client systems 110(1)-110(N) participating in a network bandwidth management protocol. The other client systems 110(1)-110(N) may transmit task priorities and throughput measurements to the bandwidth allocation module 318. The bandwidth allocation module 318 may determine bandwidth allocations for the client systems 110 based on task priorities of the client systems 110 and/or other factors (e.g., available network bandwidth as indicated by one or more throughput measurements, a network bandwidth allocation policy, and/or a network bandwidth cap). The bandwidth allocation module 318 may communicate bandwidth allocations to the client systems 110.

An arbiter may be specified or may be selected according to one or more algorithms. For example, an arbiter may be a client system 110 with a highest priority task. The arbiter may allocate adequate bandwidth for its task and may then allocate remaining bandwidth among the other client systems 110 in order of descending task priorities. In another embodiment, an arbiter may be specified or configurable (e.g., an administrator may use an user interface to specify a network client). An arbiter may be a network client with a lowest CPU utilization or the most available resources according to some embodiments.

According to some embodiments, an arbiter may not be used and network bandwidth negotiation may be performed as a peer to peer process. For example, a bandwidth allocation module 318 may initiate a network bandwidth negotiation by transmitting, to other network clients, a negotiation request and a priority associated with a task. Other network clients may transmit a current throughput and a priority associated with a task. The task priorities may be used to determine bandwidth allocation with bandwidth being allocated first to clients associated with highest priority tasks.

According to some embodiments, bandwidth allocation module 318 may use a token passing protocol to build a data structure of task priorities associated with network clients. Each of the network clients may allocate bandwidth based upon a comparison of its task priority with other task priorities of other network clients. According to some embodiments, allocation may proceed in order of a highest priority to a lowest priority using a token passing protocol. For example, a first round of token passing may allow network clients to determine one or more task priorities associated with each client. A second round of token passing may proceed from network clients associated with highest priority tasks to lowest priority tasks and may allow network clients to allocate bandwidth for their respective tasks in order of task priority.

Error handling module 320 may handle one or more errors with network bandwidth management including, but not limited to, errors with network client bandwidth assignment, network client priority reporting, network client throughput reporting, and network bandwidth negotiation.

Figure 4:
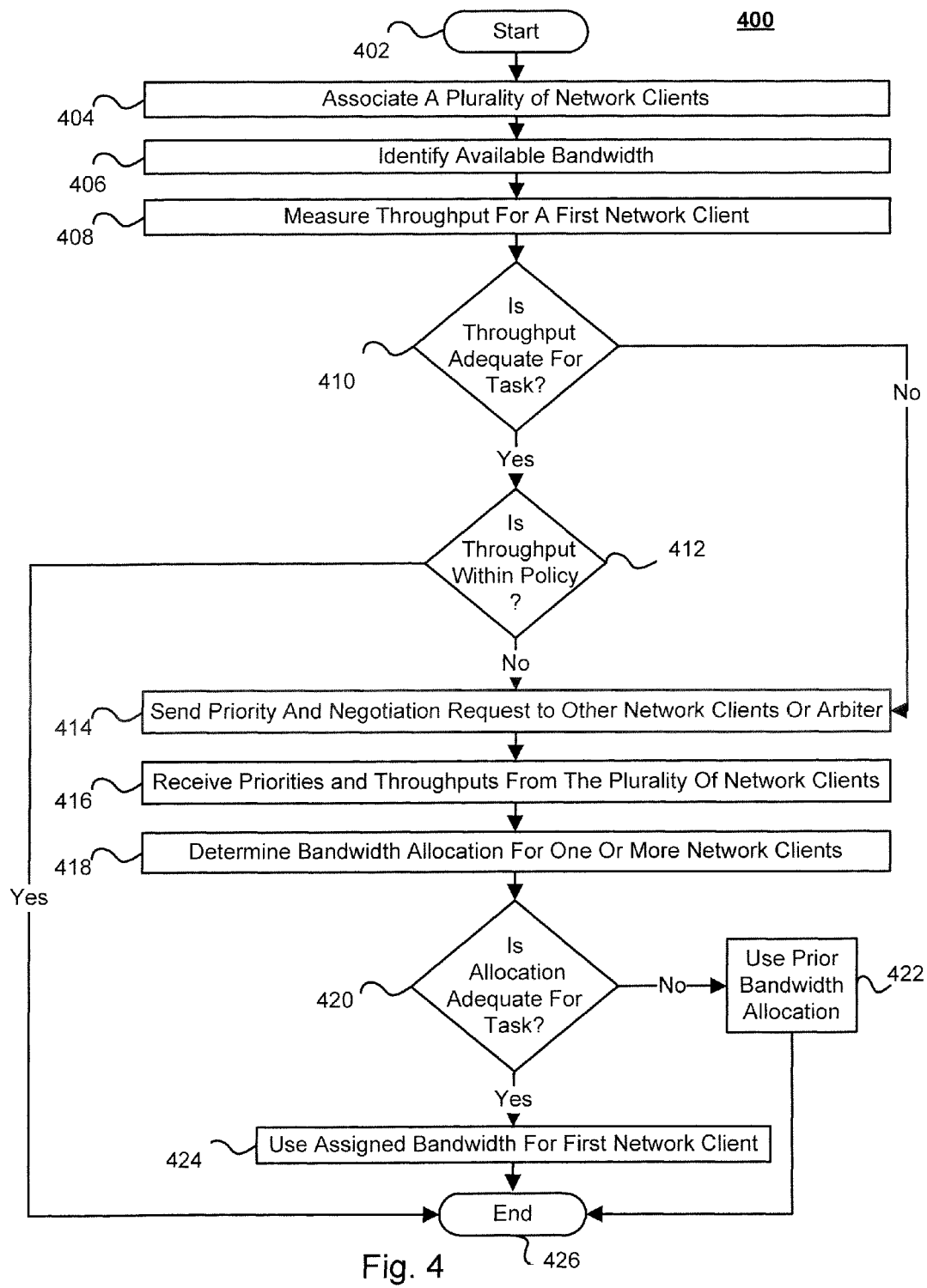
FIG. 4 depicts a method for network bandwidth management in accordance with an embodiment of the present disclosure.

Referring to FIG. 4, there is depicted a method 400 for network bandwidth management in accordance with an embodiment of the present disclosure. At block 402, the method 400 may begin.

At block 404, a plurality of network clients may be associated with a network bandwidth management protocol. According to some embodiments, association of a client may be performed by incorporation of a module into an application so that a plurality of instances of an application or a plurality of application clients participate in a network bandwidth management protocol.

At block 406, available bandwidth may be identified. Available network bandwidth may be calculated or a specified network bandwidth parameter may be accessed to determine available network bandwidth.

At block 408, throughput for one or more network clients may be measured. An amount of time a transfer takes to complete for a known amount of data may be determined to identify a throughput for a network client.

At block 410, it may be determined whether the throughput for a network client is adequate for a task of the network client. If the throughput of a client is adequate for a task of a client (e.g., a backup job) the method may continue at block 412. If the throughput of a client is not adequate for a task of a client, the method may continue at block 414.

At block 412, it may be determined whether the throughput for a network client exceeds a policy, cap, maximum bandwidth and/or specified available bandwidth. For example, allocation of a specified bandwidth cap among client systems 110(1)-110(N) or servers 140 of FIG. 1 (e.g., a bandwidth cap may be 50% of total network bandwidth) may be tracked. If an individual client has throughput indicating sufficient bandwidth to complete a task, but an allocation of such bandwidth would exceed a bandwidth cap, the method may continue at block 414. If an individual client has throughput indicating sufficient bandwidth to complete a task and an allocation of such bandwidth would not exceed a bandwidth cap, the method may end at block 426.

At block 414, initiation of negotiation of network bandwidth allocation may begin. A network client may send a task priority and a negotiation request to other network clients or an arbiter. According to some embodiments, one of client systems 110(1)-110(N) or servers 140 of FIG. 1 may be specified as an arbiter to receive negotiation requests. The negotiation request may be transmitted to other client systems 110(1)-110(N) participating in a network bandwidth management protocol.

At block 416, other client systems 110(1)-110(N) or servers 140 of FIG. 1 may transmit task priorities and throughput measurements to the arbiter. At block 418, the arbiter may determine bandwidth allocations for the client systems 110 based on task priorities of the client systems 110 and/or other factors (e.g., available network bandwidth as indicated by one or more throughput measurements, a network bandwidth allocation policy, and/or a network bandwidth cap). The arbiter may communicate bandwidth allocations to the client systems 110.

An arbiter may be specified or may be selected according to one or more algorithms. For example, an arbiter may be a client system 110 with a highest priority task. The arbiter may allocate adequate bandwidth for its task and may then allocate remaining bandwidth among the other client systems 110 in order of descending task priorities. In another embodiment, an arbiter may be specified or configurable (e.g., an administrator may use an user interface to specify a network client). An arbiter may be a network client with a lowest CPU utilization or the most available resources according to some embodiments.

According to some embodiments, an arbiter may not be used in block 414 and network bandwidth negotiation may be performed as a peer to peer process. For example, initiation of a network bandwidth negotiation may begin by transmitting, to other network clients, a negotiation request and a priority associated with a task. In such an embodiment, at block 416, other network clients may transmit a current throughput and a priority associated with a task. At block 418, the task priorities may be used to determine bandwidth allocation with bandwidth being allocated first to clients associated with highest priority tasks.

According to some embodiments, a token passing protocol may be used to build a data structure of task priorities associated with network clients. Each of the network clients may allocate bandwidth based upon a comparison of its task priority with other task priorities of other network clients. According to some embodiments, allocation may proceed in order of a highest priority to a lowest priority using a token passing protocol. For example, a first round of token passing may allow network clients to determine one or more task priorities associated with each client. A second round of token passing may proceed from network clients associated with highest priority tasks to lowest priority tasks and may allow network clients to allocate bandwidth for their respective tasks in order of task priority.

At block 420, it may be determined whether a bandwidth allocation is adequate for a task. If a bandwidth allocation is adequate for a task, the method may continue at block 424. If a bandwidth allocation is not adequate for a task, the method may continue at block 422.

At block 422, a network client may use a previous network bandwidth allocation to perform a task.

At block 424, a network client may use the newly assigned bandwidth for a task. At block 426, the method 400 may end.

Figure 5:
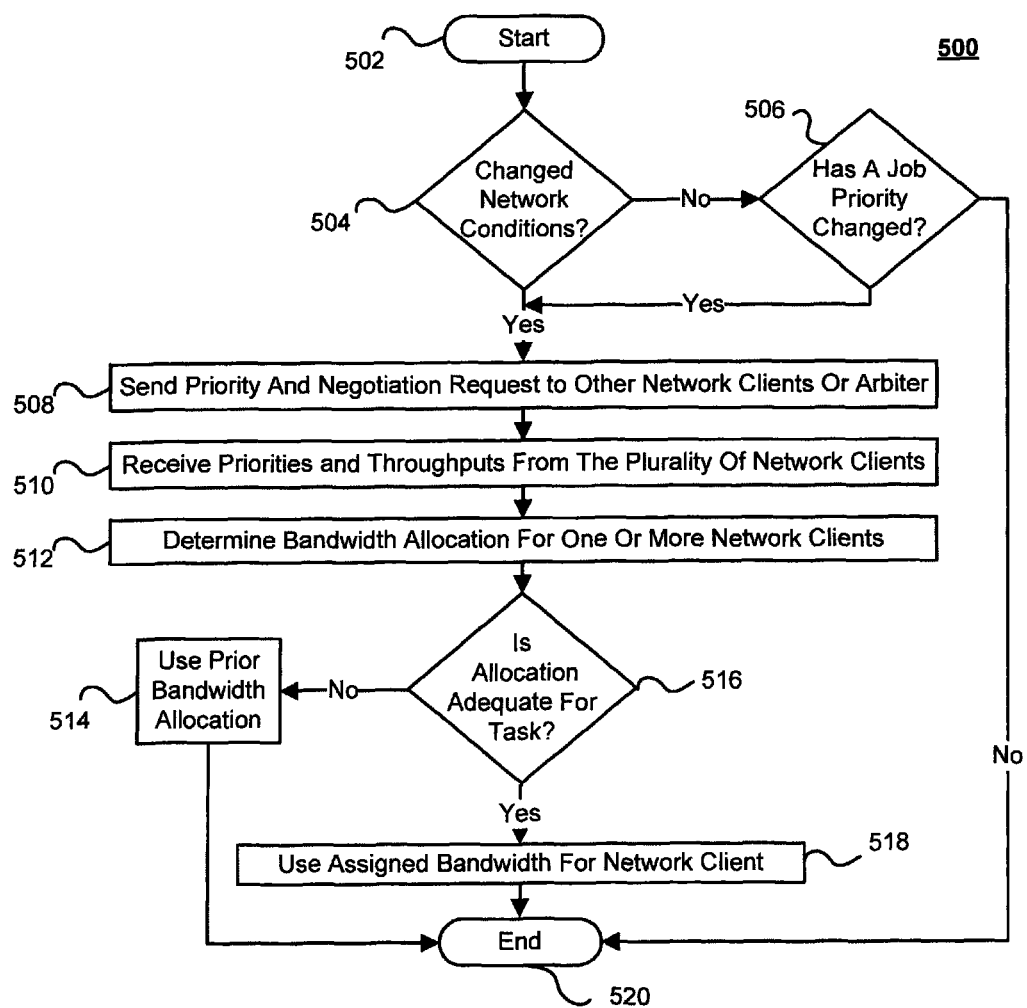
FIG. 5 depicts a method for network bandwidth management monitoring in accordance with an embodiment of the present disclosure.

Referring to FIG. 5, there is depicted a method 500 for network bandwidth management monitoring in accordance with an embodiment of the present disclosure. At block 502, the method 500 may begin.

At block 504, it may be determined if one or more network conditions have changed. Network conditions and available bandwidth may be continually changing due to one or more factors. Network bandwidth management protocols as described above may not be implemented on all clients. Other network clients, which do not use network bandwidth management protocols, may use network bandwidth and the availability of network bandwidth to allocate among network bandwidth managed clients may vary. According to some embodiments, network clients may report, to other network bandwidth management modules 154 and/or to an arbiter, one or more network bandwidth factors including, but not limited to, changes in throughput, Network bandwidth factors may be reported upon detection or periodically. Reporting of a network bandwidth factor may depend on the network bandwidth factor change detected. If a changed network condition has been detected, the method may continue at block 508. If no changed network conditions have been detected, the method may continue at block 506.

At block 506, additional factors may affect network conditions and available bandwidth may be considered. For example, tasks may complete or be halted or cancelled, new tasks may be initiated (e.g., new backup jobs), priorities of tasks may be changed, and bandwidth may be added to or subtracted from a network. If an additional factor such as a change in the priority of a job or a task is detected, the method may continue at block 508. If no additional factors affecting network conditions have been detected, the method may end at block 520.

At block 508, network bandwidth negotiation may begin again. Blocks 508, 510, 512, 514, 516, and 518 may correspond to operations as described above for blocks 414-424 in FIG. 4.

At block 520, the method 500 may end.

At this point it should be noted that network bandwidth management in accordance with the present disclosure as described above typically involves the processing of input data and the generation of output data to some extent. This input data processing and output data generation may be implemented in hardware or software. For example, specific electronic components may be employed in an network bandwidth management module or similar or related circuitry for implementing the functions associated with network bandwidth management in accordance with the present disclosure as described above. Alternatively, one or more processors operating in accordance with instructions may implement the functions associated with network bandwidth management in accordance with the present disclosure as described above. If such is the case, it is within the scope of the present disclosure that such instructions may be stored on one or more processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method for network bandwidth management comprising:
    determining, using at least one computer processor, a throughput measurement for a first network client of a plurality of network clients;
    determining if throughput for the first network client is adequate for a first task based at least on the throughput measurement;
    in the event throughput is not adequate, negotiating for a different amount of network bandwidth, wherein the negotiation comprises:
        sending a first task priority for the first network client and the throughput measurement to at least one second network client of the plurality of network clients; and
        receiving an allocation of network bandwidth based on a comparison of the first task priority with at least one second task priority for the at least one second network client.

2. The method of claim 1, wherein the second network client is configured to perform network allocation request arbitration.

3. The method of claim 2, wherein receiving the different amount of network bandwidth comprises receiving the allocation from the second network client.

4. The method of claim 1, wherein the first task priority and throughput measurement are sent to the plurality of network clients.

5. The method of claim 4, wherein the negotiation comprises a peer to peer negotiation among the plurality of network clients based at least in part on task priority.

6. The method of claim 5, wherein the peer to peer negotiation further comprises a token passing protocol configured to build a data structure of task priorities, and wherein each network client of the plurality of network clients allocates its own bandwidth according to the data structure of task priorities.

7. The method of claim 1, wherein network bandwidth available for allocation comprises at least one of: total available network bandwidth and a specified network bandwidth.

8. The method of claim 7, wherein the specified network bandwidth comprises a subset of total available network bandwidth.

9. The method of claim 1, further comprising identifying total available network bandwidth.

10. The method of claim 1, further comprising:
    determining, in the event the throughput is adequate, if the throughput is within a specified network bandwidth;
    in the event the throughput is not within the specified network bandwidth, performing the negotiation for additional network bandwidth allocation.

11. The method of claim 1, further comprising:
    determining whether the allocation of network bandwidth is adequate for the first task; and
    in the event the allocation of network bandwidth is not adequate for the first task, repeating the negotiation for a different amount of network bandwidth.

12. The method of claim 11, further comprising:
    determining that a repeated negotiation for a different amount of network bandwidth resulted in an inadequate allocation of network bandwidth; and
    reverting to a prior allocation of network bandwidth.

13. The method of claim 1, further comprising:
    receiving an indication that at least one of: a network condition has changed and the first task priority has changed; and
    repeating the negotiation for a different amount of network bandwidth based on the received indication.

14. The method of claim 1, further comprising:
    periodically transmitting at least one of a current task priority and a current throughput measurement from the first network client; and
    determining whether at least one of the current task priority and the current throughput measurement is different from with previously sent first task priority and the throughput measurement for the first network client.

15. The method of claim 1, wherein the first network client performs multiple tasks requiring network bandwidth, and wherein bandwidth is negotiated for each of the multiple tasks separately.

16. The method of claim 1, wherein the first network client performs multiple tasks requiring network bandwidth, and wherein bandwidth is negotiated for using a highest priority of the multiple tasks.

17. The method of claim 1, wherein the plurality of network clients comprise network clients running different installations of a same application, and wherein task priority is coordinated across the same application.

18. At least one non-transitory processor readable storage medium for storing a computer program of instructions configured to be readable by at least one processor for instructing the at least one processor to execute a computer process for performing the method as recited in claim 1.

19. An article of manufacture for network bandwidth management, the article of manufacture comprising:
- at least one non-transitory processor readable medium; and
- instructions stored on the at least one medium;
- wherein the instructions are configured to be readable from the at least one medium by at least one processor and thereby cause the at least one processor to operate so as to:
  - determine a throughput measurement for a first network client of a plurality of network clients;
  - determine if throughput for the first network client is adequate for a first task based at least on the throughput measurement;
  - in the event throughput is not adequate, negotiate for a different amount of network bandwidth, wherein the negotiation comprises:
    - sending a first task priority for the first network client and the throughput measurement to at least one second network client of the plurality of network clients; and
    - receiving an allocation of network bandwidth based on a comparison of the first task priority with at least one second task priority for the at least one second network client.

20. A system for network bandwidth management comprising:
- one or more processors communicatively coupled to a network; wherein the one or more processors are configured to:
  - determine a throughput measurement for a first network client of a plurality of network clients;
  - determine if throughput for the first network client is adequate for a first task based at least on the throughput measurement;
  - in the event throughput is not adequate, negotiate for a different amount of network bandwidth, wherein the negotiation comprises:
    - sending a first task priority for the first network client and the throughput measurement to at least one second network client of the plurality of network clients; and
    - receiving an allocation of network bandwidth based on a comparison of the first task priority with at least one second task priority for the at least one second network client.

\* \* \* \* \*